April 8, 1969  H. E. BRANSON  3,436,917
AUXILIARY CONTROL FOR A DUAL HYDRAULIC BRAKE SYSTEM
Filed Feb. 7, 1966
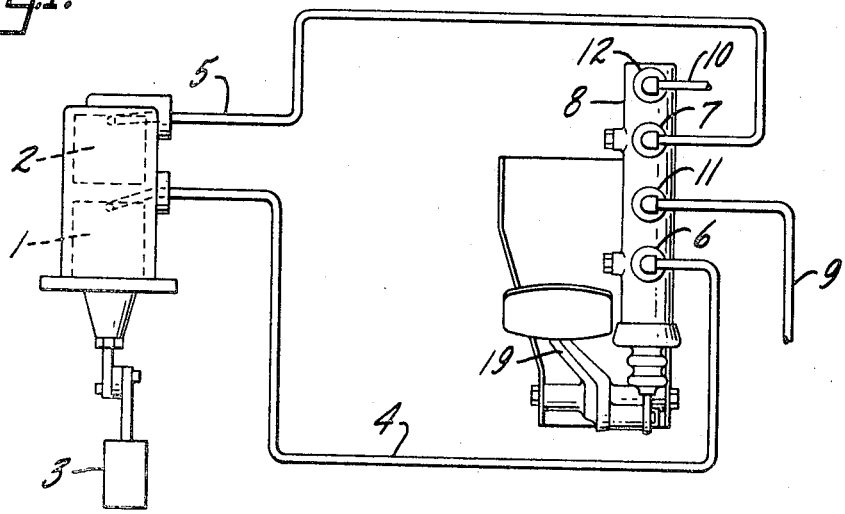
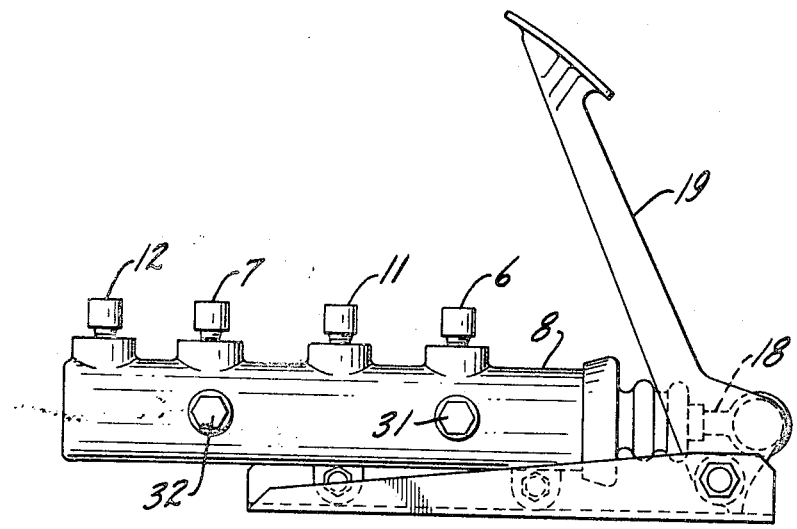
INVENTOR.
Henry E. Branson,
BY Parker & Carter
Attorneys.

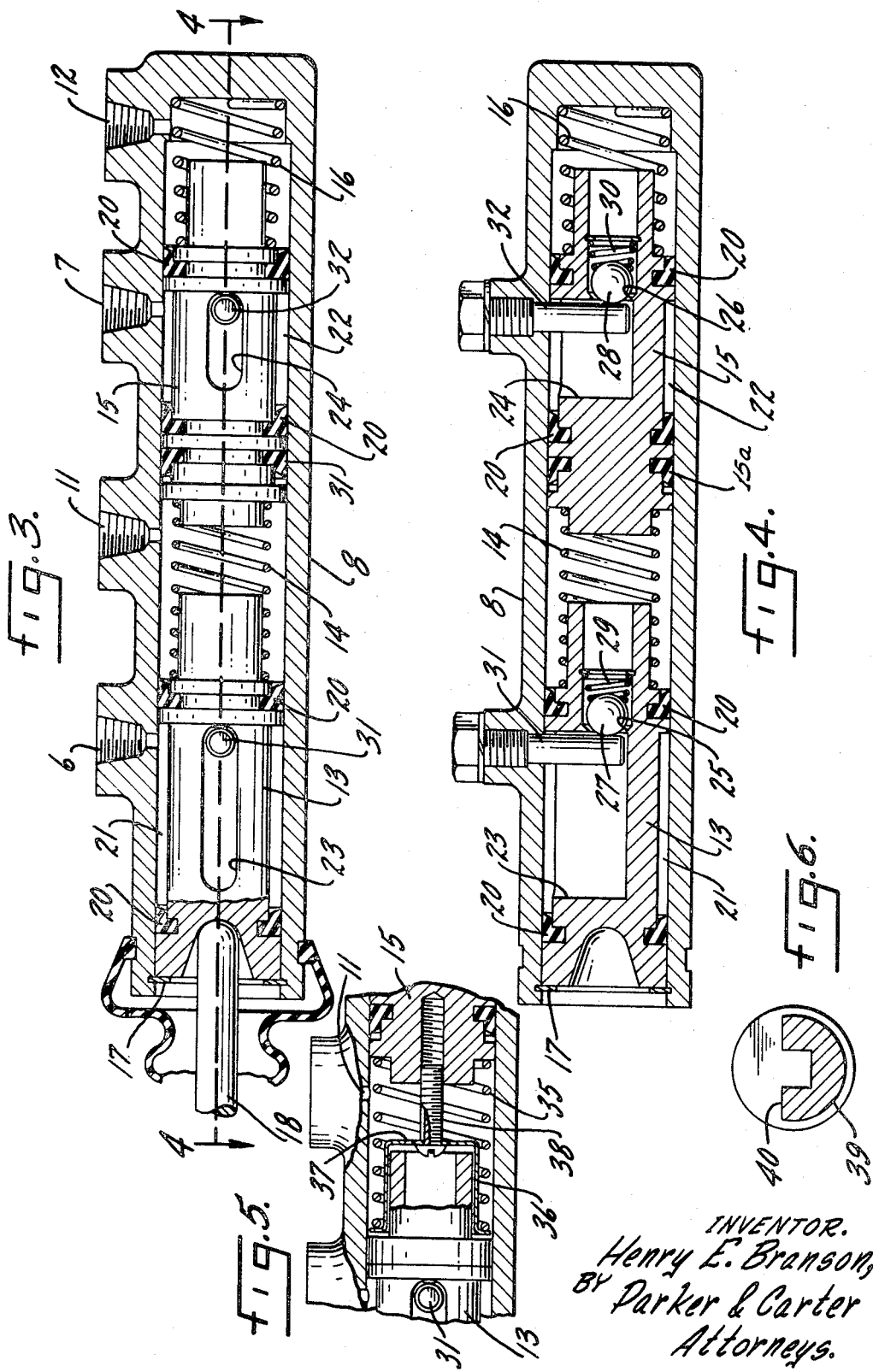

United States Patent Office 3,436,917
Patented Apr. 8, 1969

3,436,917
AUXILIARY CONTROL FOR A DUAL HYDRAULIC
BRAKE SYSTEM
Henry E. Branson, Chicago, Ill., assignor to Stromberg
Hydraulic Brake & Coupling Company, Chicago, Ill.,
a corporation of Illinois
Filed Feb. 7, 1966, Ser. No. 525,712
Int. Cl. F15b 7/08; F16d 65/32
U.S. Cl. 60—54.5                    7 Claims

ABSTRACT OF THE DISCLOSURE

A cylinder containing a power piston and a floating piston dividing the interior of the cylinder into two separate chambers. An intake and an exhaust port for each chamber. Each cylinder actuating a separate valve adapted to be seated upon piston movement to apply pressure for discharge through the outlet ports and to prevent back pressure through the intake ports.

---

This invention relates to auxiliary control for a dual hydraulic brake system and has for one object to provide in a single unitary installation means whereby brake pressure from each of the two or more automobile brake master cylinders may be simultaneously controlled independent of the manipulation of the conventional master cylinder.

Another object is to provide in a single unit a mechanism which will independently so far as the hydraulic system is concerned control each of the two or more hydraulic brake systems, for example, of the type where duel means are provided to separately apply pressure to front and rear wheels of an automobile.

Other objects will appear from time to time throughout the specification and claims.

The invention is illustrated more or less diagrammatically in the accompanying drawings, wherein:

FIGURE 1 is a diagrammatic flow sheet illustrating the use of the device;

FIGURE 2 is a side elevation of the device;

FIGURE 3 is a longitudinal section with parts in elevation;

FIGURE 4 is a section along the line 4—4 of FIGURE 3 looking in the direction of the arrows;

FIGURE 5 is a detail side elevation in part section of a modified arrangement of the floating spring;

FIGURE 6 is a section through one of the pistons showing a modified form.

An automobile dual brake system includes tandem master cylinders 1 and 2 simultaneously actuated by a pedal 3. Ducts 4 and 5 lead from cylinders 1 and 2 to spaced inlets 6 and 7 in an auxiliary cylinder 8. Ducts 9 and 10 lead from the outlets 11 and 12 of the cylinder 8 respectively to the front and rear wheel brakes of an automotive vehicle. These brakes being conventional, need no further illustration.

When, as will hereafter appear, the auxiliary control is idle, there is a free path for hydraulic fluid from each of the master cylinders to the front and rear wheel brakes respectively but when the auxiliary control is operated, the pressure line from the master cylinders is cut off and pressure is separately applied to the wheels independent of the master cylinders.

The cylinder 8 is closed at one end, open at the other and contains in alignment a power piston 13, a floating spring 14, a floating piston 15 and a retracting or return spring 16. Withdrawal of the assembly from the cylinder is inhibited by a removable abutment or piston stop 17. A push rod 18 penetrates the open end of the cylinder to engage the power piston 13. The lever 19 may be manipulated to apply pressure to the power piston.

Suitable packing cups 20 are provided for each end of each of the pistons. Each piston is reduced intermediate its ends intermediate the packing cups to provide clearances 21 and 22 between the pistons 13 and 15 and the inner wall of the cylinder.

Each piston is slotted as at 23 and 24 in communication with the clearances 21 and 22 respectively and the outboard end of each piston is apertured to define valve seats 25, 26 engaged by ball valves 27, 28 seated by valve springs 29 and 30. Stop pins 31 and 32 in the wall of the cylinder 8 penetrate the slots 23 and 24 and when the pistons are in retracted position, the ball valves are unseated by the stop pins. The slot 23 is longer than the slot 24 as will hereafter appear.

There is a separate packing ring 15a associated with the floating piston to insure that pressure generated by the power piston cannot reach the hydraulic system associated with the floating piston.

In the inactive position, the retracting spring exerts pressure on the floating piston. The floating piston through the floating spring moves or holds the power piston against the abutment. The retracting spring not being strong enough to compress the floating spring, there is a clear hydraulic passage through the auxiliary cylinder for both of the dual brake systems. Hydraulic pressure can enter through inlet 6, clearance 21, slot 23 the piston 13, through valve seat 25 and out through outlet 11 for one of the brake systems and the same situation prevails with respect to the other brake system, hydraulic fluid entering through port 7, clearance 22, slot 24 in piston 15, valve seat 26, exhaust port 12.

When pressure is applied to the push rod 18, the entire assembly moves forward. The ball valves leave the stop pins 31 and 32 and are seated by the springs. This cuts off connection between the auxiliary control and the motor vehicle master cylinders. This movement compresses the return spring and enables the floating piston 15 to apply pressure in the cylinder to force hydraulic fluid out through the port 12. Depending on spring constants, as soon as the pressure applied by the power piston through the floating spring to the floating piston exceeds the resistance of the return spring 16 and the hydraulic pressure generated by the floating piston, further movement of the power piston compresses the floating spring to allow the power piston to approach the floating piston and generate on its own account pressure for discharge through the outlet 11. This pressure may build up a little later than the pressure through outlet 12 and as a result this pressure will be a little lower during buildup than the presure discharged through outlet 11. This is advantageous when it is desired to have higher pressure on the brake system on one end of the vehicle than that generated at the other end.

The travel of the power piston will always be somewhat longer than the travel of the floating piston. Thus the slot in the power piston must be enough longer to permit such differential travel. Another reason for this longer slot is that if there should be a failure in one or other of the brake systems, such failure can be compensated for by excessive travel of the power piston.

Under some circumstances it may be desirable to preload or perhaps to adjustably preload the floating spring. FIGURE 5 shows such an arrangement. The floating spring 35 abuts at one end on the piston 15 and at the other end on the flange of a stove pipe shaped sleeve 36 which fits over the outboard end of the piston 13. The sleeve 36 is apertured at 37 so as to not interfere with outward flow of hydraulic fluid through the valve seat 25 to and through the outlet 11. A pin 38 is threaded in the end of the piston 15 and keyed to the sleeve 36 so that the sleeve may be rotated to screw the threaded end of the pin 38 in or out of the piston 15 to adjust the preloading of the spring. The sleeve 36 will support the spring 35 at the desired preloading position and the pin 38 will limit expansion of the spring 35 when the pressure applied by the piston 13 against the spring and against the piston 15 exceeds the predetermined point, the spring 35 will be compressed, the sleeve 36 will slide along the preloading pin 38 and hydraulic fluid will be forced out through the exhaust port 11 from the space between the two pistons.

Referring to FIGURE 6, a portion of the piston 39 is cut away as at 40 to provide a wide clearance area for the slot 23 or 24.

I claim:
1. In a dual braking system,
master cylinder means,
first and second separate brake systems,
each brake system having a hydraulic duct extending from the master cylinder means to associated braking means, such as the front and rear brakes in a wheeled vehicle,
a control assembly connected in series with each of the hydraulic ducts between the master cylinder means and the braking means, and adapted to permit free flow of hydraulic pressure fluid therethrough along separate fluid flow paths, one path for each brake system, upon actuation of the master cylinder means,
said control assembly being adapted to generate successive pressures in the first and second brake systems upon application of a single, auxiliary braking force thereto,
said control assembly including auxiliary cylinder means,
power piston means and floating piston means therein,
floating spring means between the power and floating piston means,
return spring means biasing the power and floating piston means and the floating spring means as a unit toward a retracted position,
one of said piston means being located between, and separating, the first and second fluid flow paths associated with each of the brake systems,
one of the fluid flow paths including an outlet port from the auxiliary cylinder means which communicates with the chamber formed between the floating and power piston means,
the other of the fluid flow paths including an outlet port from the auxiliary cylinder means which communicates with the downstream side of the floating piston means,
first valve means, which includes a valve member carried by the power piston means, in the first fluid flow path,
means urging said first valve means toward a closed position,
second valve means, which includes a valve member carried by the floating piston means, in the second fluid flow path,
means urging said second valve means toward a closed position,
means for holding each valve means open while the power and floating piston means are in a retracted position, and
actuating means operable in response to application of a single auxiliary braking force for moving the power and floating piston means and the floating spring means as a unit to an extended position against the return spring means, and thereby permitting closure of the first and second valve means whereby fluid flow from the master cylinder means through the control assembly is cut off.

2. The dual braking system of claim 1 further characterized in that spring constants of the floating spring means and the return spring means are dissimilar whereby relative movement between the power and floating piston means may occur during at least a portion of the movement of the aforesaid unit.

3. The dual braking system of claim 2 further characterized in that the floating spring means yields before the return spring means to thereby cause a pressure build-up in the chamber between the first and second piston means, and thereby the auxiliary cylinder means outlet port which opens into said chamber and its associated hydraulic duct, before the pressure builds up in the chamber on the downstream side of the floating piston means, and thereby the auxiliary cylinder means outlet port which opens into said downstream chamber and its associated hydraulic duct.

4. The dual braking system of claim 1 further characterized in that
each of said valve means includes two valve members, one of said valve members being a valve seat and the other of said valve members being a valve element cooperable with the valve seat,
each of the power and floating piston means carrying a valve element.

5. The dual braking system of claim 4 further characterized in that
each of the power and floating piston means also carries a valve seat.

6. A dual automotive brake system which includes a source of hydraulic pressure, separate hydraulic ducts leading therefrom to the front and rear brakes of an automotive vehicle, a single auxiliary control element in series in each of the ducts adapted separately to close the connections between the pressure source and the front and rear brakes and adapted successively and separately to apply pressure to the front and rear brakes, said auxiliary control element including an auxiliary cylinder means, a stop therein, aligned power and floating pistons, a floating spring between them, a return spring biasing the pistons and floating spring as a unit against the stop in a retracted position, means for forcing the pistons and floating spring simultaneously as a unit away from the stop, the auxiliary cylinder means being ported for intake on the upstream sides of the power and floating pistons for connection with the ducts leading from the pressure source, and ported for discharge with that portion of the ducts on the downstream side of the auxiliary cylinder means leading to the front and rear brakes, a by-pass between the outlet port and inlet port associated with each piston, a valve controlling each by-pass and means for holding each valve open while the pistons are in the retracted position to afford unobstructed passages into and out of the auxiliary cylinder and means for seating each valve to close the by-pass when the pistons move from the retracted position.

7. The device of claim 6 characterized by the fact that the pressures applied by the two pistons on the downstream sides are different and the pressure is applied earlier by the floating piston than that applied by the power piston.

References Cited
UNITED STATES PATENTS

| | | | |
|---|---|---|---|
| 2,438,390 | 3/1948 | Erson | 91—172 |
| 2,938,996 | 5/1960 | Carswell | 92—84 |
| 2,616,658 | 11/1952 | Dombeck | 60—54.5 |
| 2,741,337 | 4/1956 | Ziskal | 60—54.6 |
| 2,894,608 | 7/1959 | Wittren | 60—54.6 |
| 3,208,223 | 9/1965 | Mamoru-Watanabe | 60—54.5 |

MARTIN P. SCHWADRON, *Primary Examiner.*

ROBERT R. BUNEVICH, *Assistant Examiner.*

U.S. Cl. X.R.

188—152